United States Patent [19]

Mrakovich et al.

[11] Patent Number: 6,106,162
[45] Date of Patent: Aug. 22, 2000

[54] GLASS OPTICAL FIBER BUNDLE CONNECTOR FOR A HYBRID FIBER OPTIC LIGHTING DISTRIBUTION SYSTEM

[75] Inventors: Matthew S. Mrakovich, Canfield; Alan B. Toot, Niles; John V. Denuto, Warren, all of Ohio

[73] Assignee: Delphi Technologies Inc., Troy, Mich.

[21] Appl. No.: 09/190,992

[22] Filed: Nov. 12, 1998

[51] Int. Cl.[7] .............................. G02B 6/00; G02B 6/36
[52] U.S. Cl. ................................................................ 385/88
[58] Field of Search ................................ 385/80–90, 147

[56] References Cited

U.S. PATENT DOCUMENTS

| 4,458,986 | 7/1984 | Yuto et al. | 385/129 |
| 4,588,256 | 5/1986 | Onstott et al. | 385/88 |
| 4,779,947 | 10/1988 | Ito | 385/88 |
| 5,099,399 | 3/1992 | Miller et al. | 362/32 |
| 5,275,593 | 1/1994 | Easley et al. | 606/4 |
| 5,436,707 | 7/1995 | Nakata et al. | 385/35 |
| 5,881,198 | 3/1999 | Hakke | 385/136 |

FOREIGN PATENT DOCUMENTS 2118317  7/1972  France .

*Primary Examiner*—Akm E. Ullah
*Attorney, Agent, or Firm*—Richard A. Jones

[57] ABSTRACT

A connector assembly for a hybrid fiber optic lighting distribution system including a connector ferrule for bundling a plurality of glass optical fiber (GOF) leads into a common upstream end and a connector housing into which is received the connector ferrule for attaching the connector ferrule to a fiber optic light source module, wherein the common upstream end of the bundled GOF is optically interfaced with a light transmission coupling rod of the fiber optic light source module.

13 Claims, 4 Drawing Sheets

GLASS OPTICAL FIBER BUNDLE CONNECTOR FOR A HYBRID FIBER OPTIC LIGHTING DISTRIBUTION SYSTEM

TECHNICAL FIELD

The present invention relates to fiber optic systems, and more particularly to a lighting distribution system which is a hybrid of dual optical fiber media. Still more particularly, the present invention relates to a connector for bundling a plurality of leads of glass optical fiber for interfacing with a light transmission coupling rod of a fiber optic light source module.

BACKGROUND OF THE INVENTION

As motor vehicles become increasingly sophisticated, there is an attendant need for distributed lighting to a variety of locations of the motor vehicle. While discrete conventional light sources, such as incandescent bulbs, may be placed wherever lighting is desired, there are distinct disadvantages to this mode of lighting. For example, each illumination location (illumination feature) requires a separate bulb and bulb fixture, as well as a separate power lead. These requirements of discrete conventional light sources are undesirably complex and costly, and involve excessive maintenance and increased vehicular weight.

It would, therefore, be a major benefit if a fiber optic distributed lighting system could be used in place of a multiplicity of discrete light sources. However, fiber optic distributed lighting has the draw back that a source of light having sufficient brilliance to adequately illuminate a number of illumination features would require high temperature tolerant fiber optic media. Unfortunately, although available, such fiber optic media are prohibitively expensive to use throughout the fiber optic lighting distribution system.

Accordingly, what is needed in the art is a fiber optic lighting distribution system which is high temperature tolerant only where required, is inexpensive and easily maintained. More particularly, what remains needed is a connector for bundling a plurality of leads of glass optical fiber for interfacing with a light transmission coupling rod of a fiber optic light source module.

SUMMARY OF THE INVENTION

The present invention is a connector assembly including a connector ferrule for bundling a plurality of glass optical fiber (GOF) leads into a common upstream end and a connector housing for attaching the connector ferrule to a fiber optic light source module, wherein the common upstream end of the bundled GOF leads is optically interfaced with a light transmission coupling rod of a fiber optic light source module.

The GOF has a plurality of individual leads, and is preferably of the multi-stranded type. Each lead of the GOF has an upstream end and an opposite downstream end.

The connector ferrule of the connector assembly has a cylindrical body and a square nose integrally interconnected by a tapered neck, wherein the body, neck and nose collectively form a chamber within the connector ferrule. The contour of the chamber bundles the plurality of GOF leads from a generally cylindrical configuration at a rear opening (defined by the body) to a square configuration at a front opening (defined by the nose). In this regard, the GOF leads are stripped of protective jacketing at the nose, and the upstream end of each GOF lead is aligned in a common plane at the front opening of the connector ferrule and secured within the nose by epoxy.

The connector housing of the connector assembly has a casing member having an interior hollow reciprocally shaped to that of the connector ferrule, having a cylindrical body seat for receiving the ferrule body, a tapered neck seat for receiving the ferrule neck and a square nose seat for receiving the ferrule nose.

After the GOF leads are bundled in the connector ferrule, the connector ferrule is placed into the interior hollow of the casing member, wherein a front stop of the casing member at the nose seat abuts the ferrule nose and a lock arm interconnects with the ferrule body to lock the connector ferrule receivingly within the connector housing. A ferrule position assurance member provides a secondary lock to the casing member.

The connector housing further has a connection member integrally connected with the casing member for attaching the connector ferrule to a fiber optic light source module, wherein a light transmission connecting rod thereof is aligned with, and proximal to, the common plane of the GOF upstream end. In this regard, a rod seat is provided for receiving the light transmission connecting rod of the fiber optic light source module. The rod seat is precisely aligned with the nose seat, wherein raised bosses locate the light transmission connecting rod while minimizing contact therewith. The forward end of the connector housing has predetermined alignment and interface surfaces for mating with the housing of the fiber optic light source module. A pump handle lock is provided at the forward end for locking the connector housing to the fiber optic light source module.

Accordingly, it is an object of the present invention to provide a connector assembly for optically interfacing a bundle of glass optical fiber leads with a light transmission connecting rod of a fiber optic light source module.

It is an additional object of the present invention to provide a connector ferrule for guiding a plurality of glass optical fiber leads into a square cross-section for optically interfacing with a light transmission connecting rod of a fiber optic light source module.

It is a further object of the present invention to provide a connector ferrule for guiding a plurality of glass optical fiber leads into a square cross-section, and to provide a connector housing for receiving the connector ferrule for optically interfacing the plurality of glass optical fiber leads with a light transmission connecting rod of a fiber optic light source module.

These, and additional objects, advantages, features and benefits of the present invention will become apparent from the following specification.

DESCRIPTION OF THE PREFERRED EMBODIMENT

Figure 1:
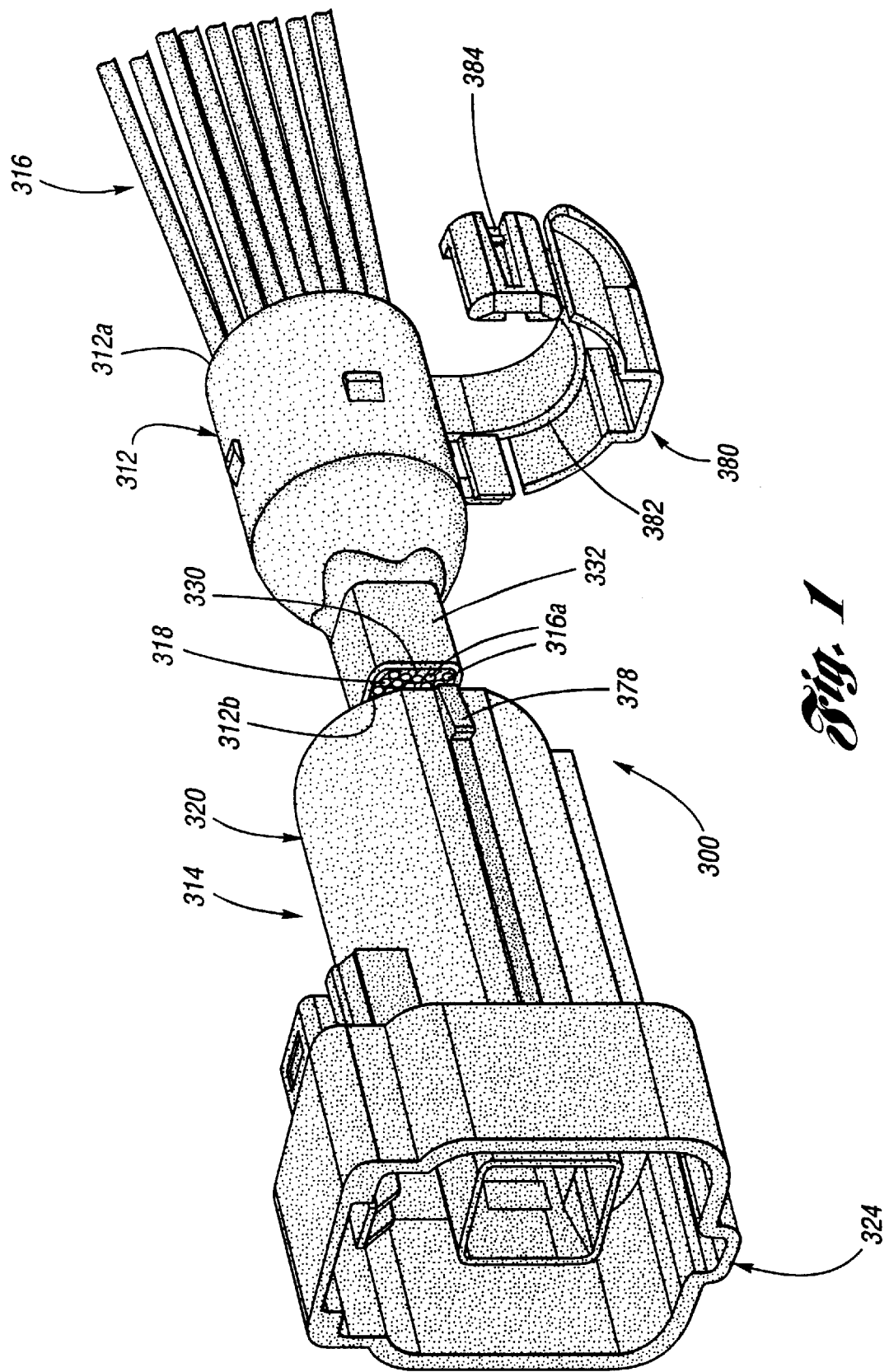
FIG. 1 is an exploded perspective view of the connector assembly according to the present invention, shown in operation with respect to a bundled plurality of glass optical fiber leads.
Figure 2:
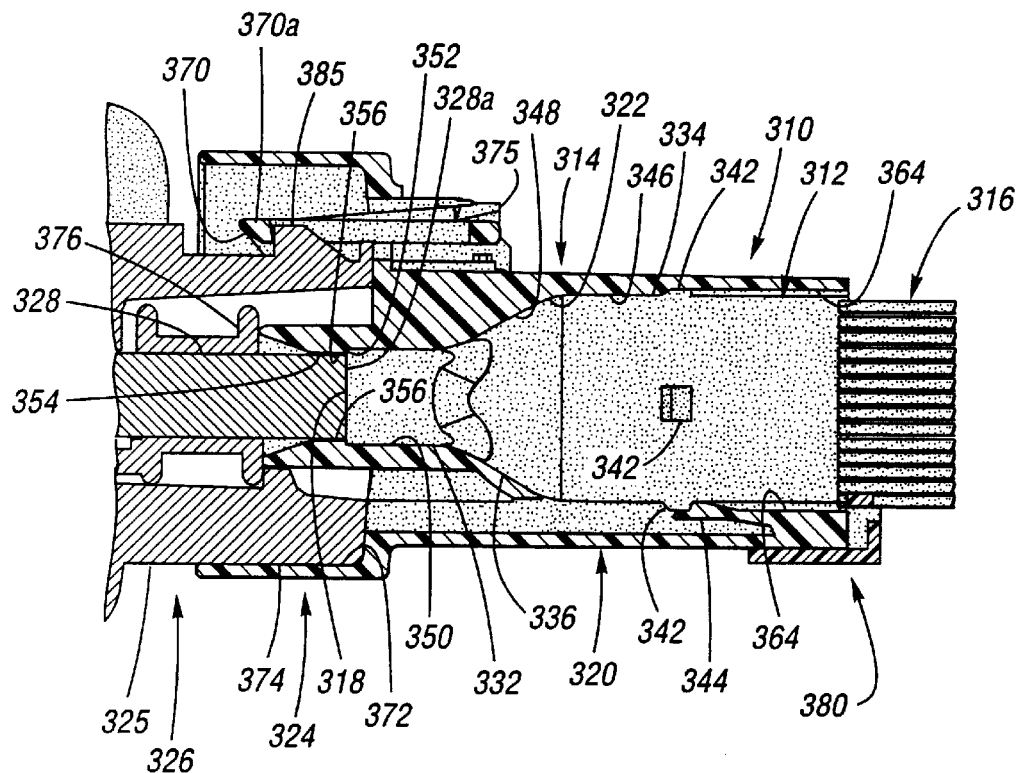
FIG. 2 is a side view of the connector assembly shown in operation with respect to a fiber optic light source module and the plurality of glass optical fiber leads.
Figure 3:
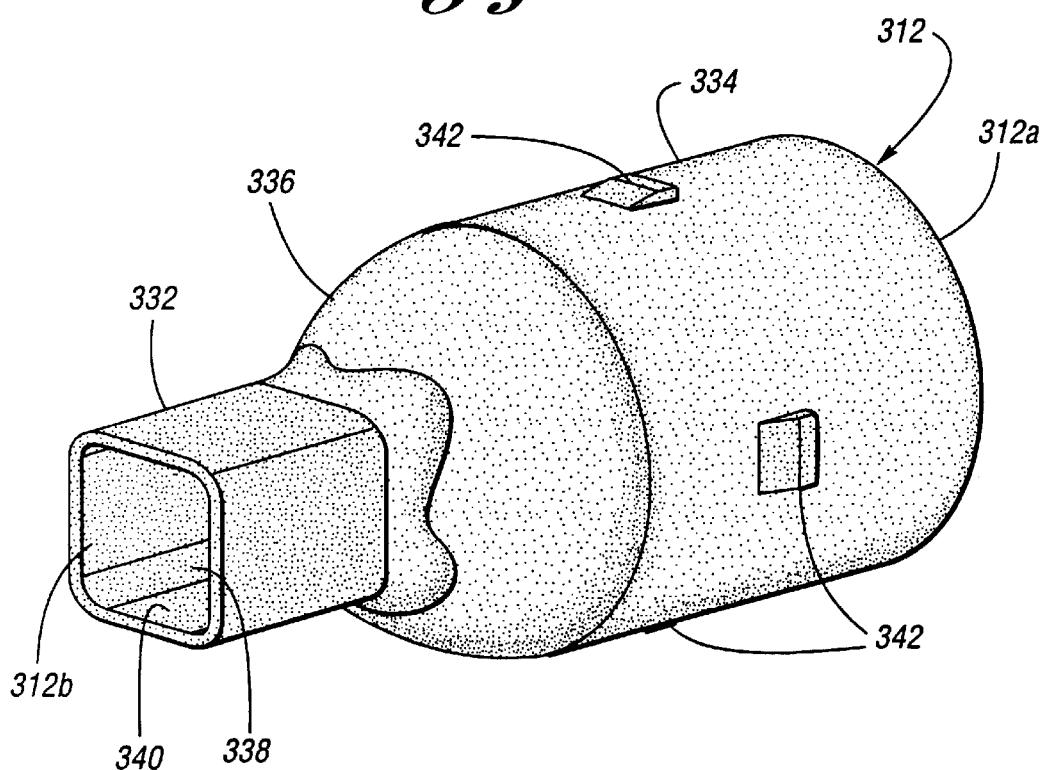
FIG. 3 is a perspective view of a connector ferrule of the connector assembly shown in FIG. 1.

Referring now to the Drawing, FIGS. 1 and 2 show the connector assembly 300 which includes a connector ferrule 312 and a connector housing 314. The connector ferrule 312 bundles a plurality of glass optical fiber (GOF) leads 316 into a common plane GOF upstream face 318. The connector housing 314 has a casing member 320 having an interior hollow 322 for receiving the connector ferrule 312. The connector housing 314 further has a connection member 324 for affixing the connector ferrule 312 to a fiber optic light source module 326, wherein the GOF upstream face 318 is optically interfaced with a square cross-sectioned light transmission connecting rod 328 of the fiber optic light source module. Preferably, the connector ferrule 312 and the connector housing 314 are each composed of molded plastic resistant to the high heat output of the fiber optic light source module 326.

The plurality of GOF leads 316 are preferably of the multi-stranded type, each having a GOF upstream end 316a and an opposite GOF downstream end (not shown). The plurality of GOF leads 316 enter the rear opening 312a of the connector ferrule 312 and the near end of the GOF leads 316 terminate at the GOF upstream face 318 at the front opening 312b of the connector ferrule. In this regard, the plurality of GOF leads 316 are stripped of their protective jacketing and are retained by epoxy 330 at a square shaped nose 332 of the connector ferrule 312.

Referring now additionally to the remaining figures, the structure and functional features of the connector assembly 300 will be further detailed.

Figure 4:
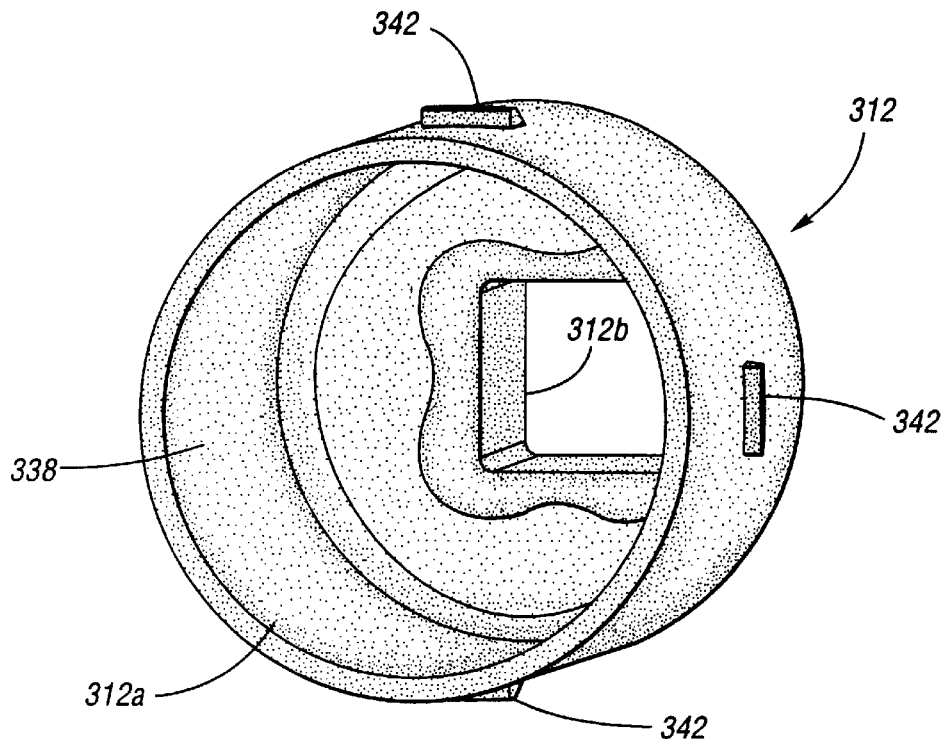
FIG. 4 is a rear perspective view of the connector ferrule, showing the interior surfaces thereof for guiding a plurality of glass optical fiber leads.

The connector ferrule 312 has a cylindrically shaped body 334, the aforementioned nose 332 and a tapered neck 336 integrally formed between the body and the nose. The body 334, neck 336 and nose 332 collectively form a chamber 338 extending from the rear opening 312a to the front opening 312b of the connector ferrule 312. As shown at FIG. 4, the chamber 338 is cylindrically shaped at the body 334, is taperingly contoured at the neck 336, and is square shaped at the nose 332.

Accordingly, the aforesaid bundling of the plurality of GOF leads 316 by the connector ferrule 312 is characterized by the GOF leads being guided from a generally cylindrical configuration at the rear opening 312a to a square configuration at the front opening 312b, and, as described hereinabove, secured thereto by epoxy 330. A chamber 340 is preferably provided at the leading edge of the nose at the front end 312b to thereby aid retention of the GOF leads.

A lock ramp 342 is provided on the exterior of the body 334 of the connector ferrule 312 for lockably interconnecting with a resilient lock arm 344 of the connector housing 314 (see FIG. 2). Preferably four lock ramps are provided at ninety degree intervals of the circumference of the body 334, as will be further discussed hereinbelow.

Figure 7:
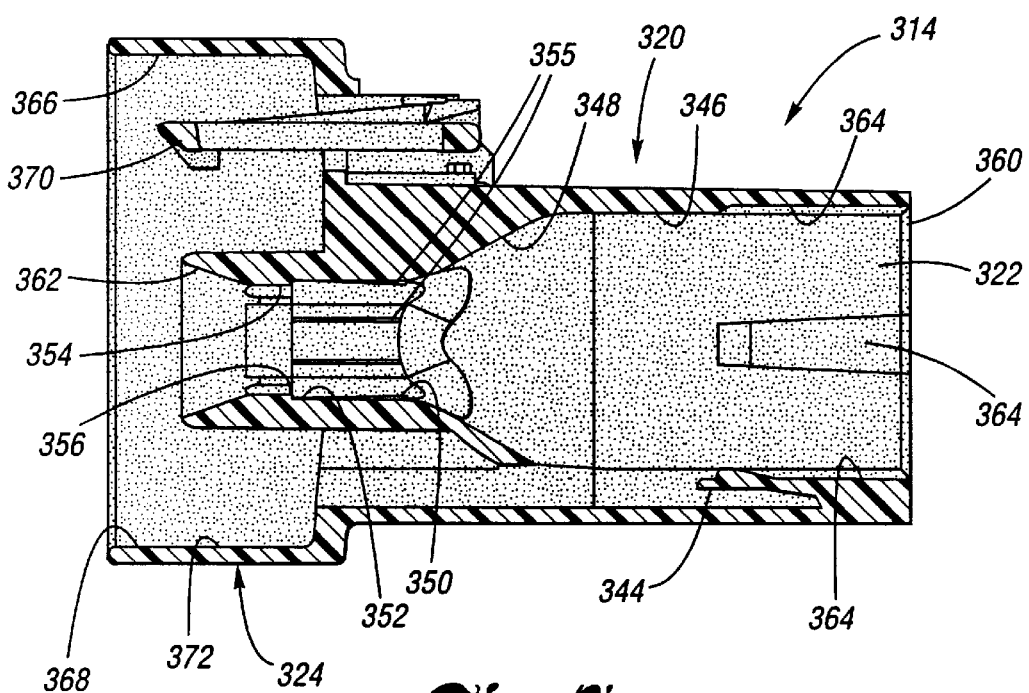
FIG. 7 is a partly sectional side view of the connector housing.

As mentioned hereinabove, the casing member 320 of the connector housing 314 has an interior hollow 322 that is reciprocally shaped to the exterior of the connector ferrule 312. As shown at FIGS. 2 and 7, the interior hollow 322 has a cylindrically shaped body seat 346 for receiving the ferrule body 334, a tapered neck seat 348 for receiving the ferrule neck 336 and a square shaped nose seat 350 for receiving the ferrule nose 332. The nose seat 350 has an abutment 352 for abutting the front end 312b of the connector ferrule 312, and a plurality of crush ribs 355 for guiding the ferrule nose 332 (see FIG. 7).

Figure 6:
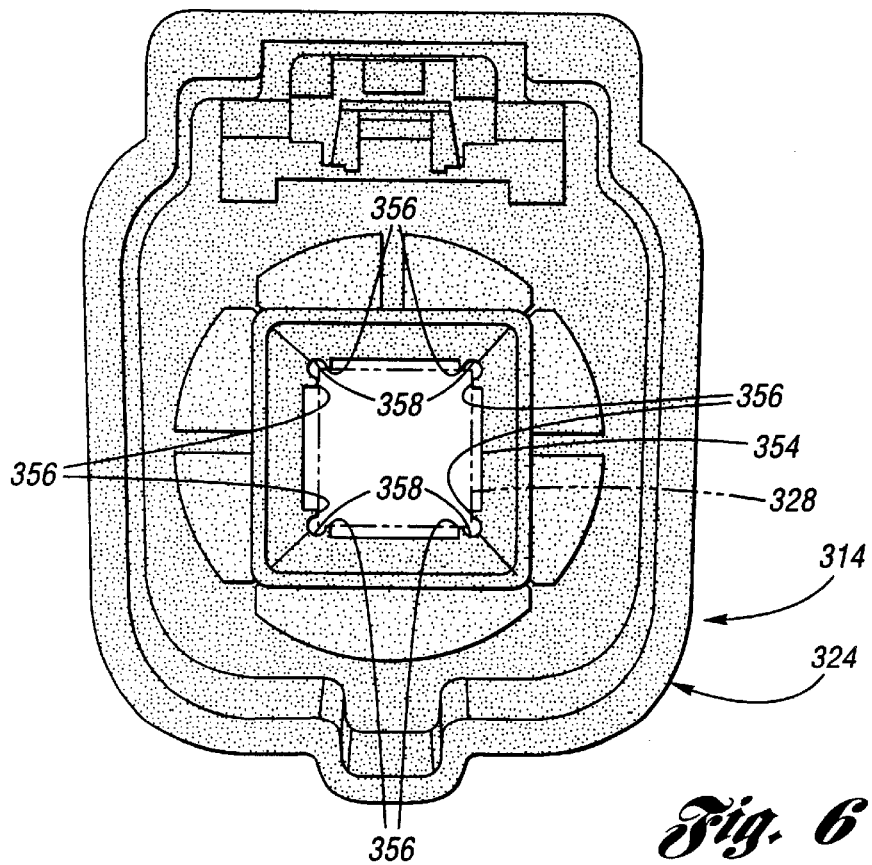
FIG. 6 is a front view of the connector housing, showing the connection member thereof for interfacing with a fiber optic light source module.

Aligned with the nose seat 350, and communicating therewith, is a square shaped rod seat 354 for receiving the aforementioned light transmission connecting rod 328. As shown best at FIG. 6, adjacent the nose seat 350, the rod seat 354 has a plurality of bosses 356 located at the corners thereof for supporting the light transmission connecting rod 328. The bosses 356 are minimized in order to ensure that they supportably contact only a minimal amount of the light transmission connecting rod 328. The corners are provided with an indentation 358 to prevent the light transmission connecting rod 328 from gouging the rod seat 354 as it is inserted thereinto.

The casing member 320 of the connector housing 314 has a rearward opening 360 at the body seat 346 into which the connection ferrule 312 is inserted, whereupon the GOF upstream face 318 is located at the abutment 352. The casing member has a flared forward opening 362 adjacent the rod seat 354 into which the light transmission connecting rod 328 is guidably inserted. In this regard, the light transmission connecting rod 328 is placed intentionally out of position toward the connector ferrule, so that when the connector ferrule mates therewith, the rod face 328a is proximate to (within one-half millimeter), and precisely aligned with, the GOF upstream face 318.

A flute 364 is provided in the casing member 320 at the body seat 346 extending inwardly from the rearward opening 360 for receiving each lock ramp 342. The lock arm 344 forms a part of one of the flutes. The entry of the lock ramps 342 into a respective flute 364 pre-orients the nose 332 to the nose seat 350.

The connection member 324 of the connector housing 314 has predetermined alignment surfaces 368 and a no-draft interface surfaces 366 for mating with the housing of the fiber optic light source module 326. A pump handle lock 370 is provided for locking the connector housing 314 to the fiber optic light source module 326, wherein a connector assurance member (not shown) inserts therein to retain the lock arm 370a thereof in an engaged relationship with a ramped ear 385 of the fiber optic light source module. A slot 372 accepts a raised rib 374 of the fiber optic light source module 326 for purposes of enhanced interconnection stability between the deeply drafted die cast aluminum of the fiber optic light source module and the molded plastic of the connector housing 314. The flared forward opening 362 abuts a resilient grommet 376 of the fiber optic light source module 326, thereby establishing the primary seal between the connector assembly 300 and the fiber optic light source module.

Figure 5:
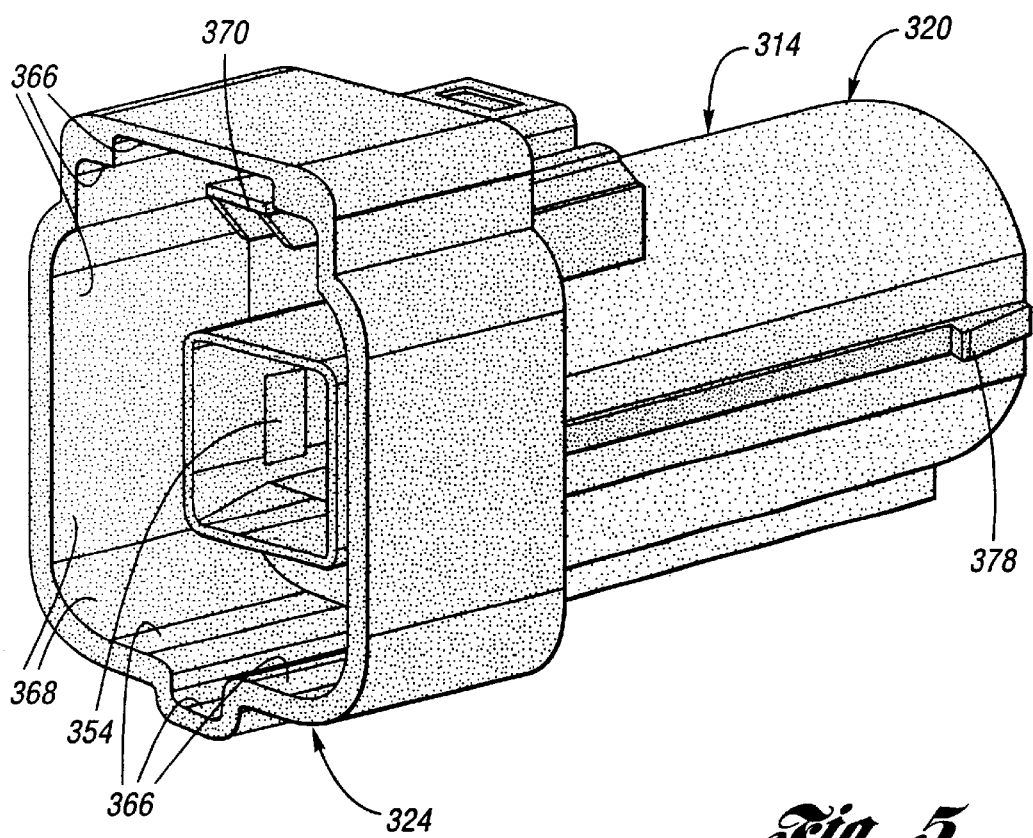
FIG. 5 is a perspective view of the connector housing.

A pair of ramped locks 378 are provided on opposite sides of the exterior of the casing member 320 (see FIG. 5). A ferrule position assurance (FPA) member 380 has a semicircular shape, including a ferrule abutment feature 382 and opposed lock slots 384. In operation, the lock slots 384 engage the ramped locks 378, whereupon the FPA member 380 holds, secondarily to the lock arm 344, the connector ferrule 312 in its received relation with respect to the connector housing 314.

In operation, the GOF upstream face 318 is provided by stripped GOF leads 316 being affixed to the nose 332 by epoxy 330. The connector ferrule 312 is placed into the interior hollow 322 of the connector housing 314 so that the nose is fully seated in the nose seat 350. The FPA member 380 is snapped onto the ramped locks 378, thereby assisting the lock arm 344 to hold the connector ferrule in place inside the connector housing 314.

The light transmission connecting rod 328 is intentionally out of position with respect to the fiber optic light source module housing 325 so as to extend a preselected extra amount outwardly from the fiber optic light source module 326. The connector member 324 is brought into engagement with the fiber optic light source module 326, wherein the light transmission connecting rod 328 inserts into the rod seat 354. Upon being fully engaged, the housing of the fiber optic light source module is sealed at the interface surfaces 368, and the flared forward opening 362 is firmly and sealingly abutted to the resilient grommet 376. During engagement, the GOF upstream face 318 abuts and pushes upon the rod face 328*a* of the light transmission connecting rod so as to move it back by flexing the resilient grommet 376 from its out of position location. At this stage, the rod face 328*a* is self-aligned with, and proximate to, the GOF upstream face 318, whereupon light from the fiber optic light source module supplies light to the GOF leads 316.

It is to be understood that the GOF leads 316 are temperature tolerant of the temperature immediately adjoining the fiber optic light source module 326.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A connector assembly for connecting a plurality of glass optical fibers to a fiber optic light source module having a light transmission connecting rod, said connector assembly comprising:

a connector ferrule having a front end and an opposite rear end, said connector ferrule having a chamber therewithin extending between said front and rear ends, said connector ferrule having a nose at said front end; and a connector housing having interior hollow means for receiving said connector ferrule, said interior hollow means comprising:

a nose seat for seatably receiving said nose; and a rod seat adjoining said nose seat for seatably receiving a light transmission connecting rod in aligned and proximal relation to said nose.

2. The connector assembly of claim 1, wherein said connector ferrule further comprises:

a generally cylindrically shaped body; and a neck integrally connected with said body, wherein said nose is integrally connected with said neck opposite said body.

3. The connector assembly of claim 2, wherein said nose is square shaped; and wherein said chamber is contoured from a generally cylindrical shape at said body to a square shape at said nose.

4. The connector assembly of claim 3, further boss means at said rod seat for minimally contacting and supporting a light transmission connecting rod when received in said rod seat.

5. The connector assembly of claim 4, further comprising locking means for retaining said connector ferrule within said interior hollow of said connector housing.

6. The connector assembly of claim 5, further comprising ferrule position assurance member means for engaging said connector housing and abutting said rear end of said connector ferrule.

7. The connector assembly of claim 6, further comprising connection member means integrally connected with said connector housing for lockingly and sealingly mating said connector housing with the fiber optic light source module.

8. A connector assembly for connecting a plurality of glass optical fibers to a fiber optic light source module having a light transmission connecting rod, said connector assembly comprising:

a connector ferrule having a front end and an opposite rear end, said connector ferrule having a chamber therewithin extending between said front and rear ends, said connector ferrule having a nose at said front end;

a plurality of glass optical fiber leads bundled within said chamber, said plurality of glass optical fiber leads forming a planar upstream face within said nose at said front end; and a connector housing having interior hollow means for receiving said connector ferrule, said interior hollow means comprising:

a nose seat for seatably receiving said nose; and a rod seat adjoining said nose seat for seatably receiving a light transmission connecting rod in aligned and proximal relation to said nose, said rod seat having boss means for minimally contacting and supporting the light transmission connecting rod.

9. The connector assembly of claim 7, wherein said connector ferrule further comprises:

a generally cylindrically shaped body; and a neck integrally connected with said body, wherein said nose is integrally connected with said neck opposite said body.

10. The connector assembly of claim 8, wherein said nose is square shaped; and wherein said chamber is contoured from a generally cylindrical shape at said body to a square shape at said nose.

11. The connector assembly of claim 9, further comprising locking means for retaining said connector ferrule within said interior hollow of said connector housing.

12. The connector assembly of claim 10, further comprising ferrule position assurance member means for engaging said connector housing and abutting said rear end of said connector ferrule.

13. The connector assembly of claim 12, further comprising connection member means integrally connected with said connector housing for lockingly and sealingly mating said connector housing with the fiber optic light source module.

* * * * *